United States Patent [19]

Ladegast, Jr.

[11] 4,191,418
[45] Mar. 4, 1980

[54] MODULAR DESIGN OF MULTI-SIDED AWNING FOR RECREATIONAL VEHICLES

[76] Inventor: Larry Ladegast, Jr., 4437 Rockwood Dr., Louisville, Ky. 40220

[21] Appl. No.: 935,921

[22] Filed: Aug. 23, 1978

[51] Int. Cl.² .............................................. E04F 10/10
[52] U.S. Cl. .................................... 296/163; 135/5 AT
[58] Field of Search ............. 296/23 R, 163; 135/1 A, 135/5 A, 5 AT

[56] References Cited

U.S. PATENT DOCUMENTS

| | | | |
|---|---|---|---|
| 3,367,347 | 2/1968 | Smith | 135/1 A |
| 3,469,589 | 9/1969 | Mitchell | 135/5 A |
| 3,720,438 | 3/1973 | Johnson et al. | 135/5 AT X |

Primary Examiner—Joseph F. Peters, Jr.
Assistant Examiner—Michael Mar
Attorney, Agent, or Firm—Richard L. Caslin

[57] ABSTRACT

A recreational vehicle such as a truck camper is shown with a modular design of a multi-sided awning comprising at least two separate awning panels. One edge of each panel is adapted to be supported on one side of the camper at the roof line. One awning panel has an extension of the size of the other awning panel to form an L-shaped awning. A zipper fastens the coextensive edges of the two panels together to form a unitary awning. A third panel may be added on the other side to form a U-shaped awning. The addition of a fourth panel at the front would provide an awning completely encircling the vehicle.

18 Claims, 9 Drawing Figures

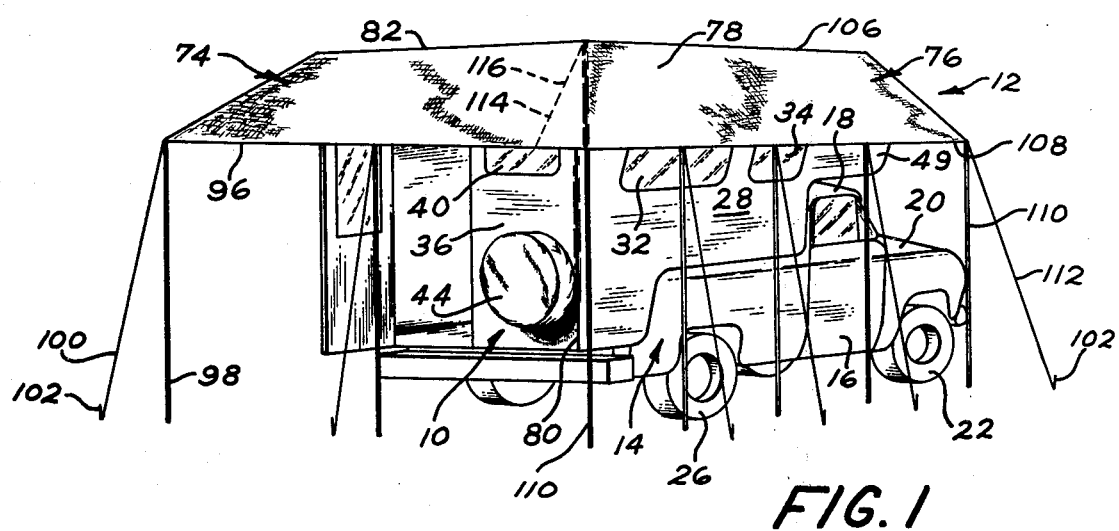

MODULAR DESIGN OF MULTI-SIDED AWNING FOR RECREATIONAL VEHICLES

BACKGROUND OF THE INVENTION

1. Field of the Invention

This invention relates to awnings or canopies for attachment to the various sides of recreational vehicles when they are parked to establish effective shields against the sun and other adverse weather conditions, as well as to enlarge the useful living space of the vehicle.

2. Description of the Prior Art

Awnings as separate pieces of equipment have been popular on recreational vehicles for many years. One kind known as "pole and stake" awnings is stored during travel, and it is assembled to the vehicle in camp. They are similar to ordinary stake-type tents, as they depend on a network of poles, stakes and guys to support the fabric canopy.

Another kind is the "automatic roll-up" awning. They are usually permanently attached to the side of the vehicle and function much like a window shade. The awning is rolled around a tube which is spring-loaded so there is always some tension on the fabric. The free edge of the awning fabric is installed in a rail mounted on the sidewall of the vehicle. The tube is supported at its two ends by support arms that are pivoted to brackets on the side of the vehicle at the floor level. For travel, the awning is rewound and drawn up against the rail where it is locked in place. This is the most common design. Another modification is to reverse the arrangement by having the tube occupy a fixed position on the wall of the vehicle, and the free end pulls out.

Generally, the support arms can either be left in their mounting brackets to form a triangular configuration, or one or both arms can be removed from its mounting bracket and arranged vertically to rest on the ground for a patio configuration. This would allow more freedom of movement in and out of the awning area.

One disadvantage in the design of awnings that are available for sale on recreational vehicles at the present time is that they are either mounted on one side of the vehicle or on the rear side of the vehicle. They are usually rectangular in configuration. If both a side and a rear awning were mounted on the same vehicle, they would be discontinuous, leaving a large corner area between the awnings unprotected.

OBJECTS OF THE PRESENT INVENTION

The principal object of the present invention is to provide a modular design of awning panels for a recreational vehicle so to create multi-sided awnings, which are also reversible for mounting to either side of the vehicle.

A further object of the present invention is to provide a modular design of a multi-sided awning of the class described, where the modular panel may be used either separately or together as an integral unit.

A further object of the present invention is to provide a modular design of a multi-sided pole and stake RV awning using a zipper-like fastener to join adjacent awning panels.

A further object of the present invention is to provide a modular design of a multi-sided awning which may employ two, three or four panels.

SUMMARY OF THE PRESENT INVENTION

The present invention provides a modular design of a multi-sided awning for a recreational vehicle having at least one side awning panel and one rear awning panel. The two panels may be mounted to the vehicle separately and individually or joined together as an integral multi-sided awning unit. One awning panel has an extension which extends beyond the vehicle and coincides with an edge of the other panel. A zipper-like fastening means joins the two panels together. Moreover, the multi-sided two panel awning is reversible, so it may be mounted to either side of the vehicle.

BRIEF DESCRIPTION OF THE DRAWINGS

This invention will be better understood from the following description taken in conjunction with the accompanying drawings and its scope will be pointed out in the appended claims.

FIG. 1 is a right rear perspective view of a truck camper fitted with a modular design of a multi-sided awning embodying the present invention on the right-rear sides of the vehicle.

FIG. 2 is a top plan view of a truck camper on a reduced scale showing the prior art of a pole and stake awning at the rear of the camper, and an automatic roll-out awning at the right side of the camper.

FIG. 3 is another top plan view of a truck camper that is fitted with the modular design of a two panel, multi-sided awning of the present invention, as was shown in FIG. 1.

FIG. 9 is a fragmentary cross-sectional view of an edge of an awning panel held down by a "common sense" fastener that is used with the present invention.

DESCRIPTION OF THE PREFERRED EMBODIMENTS

Figure 4:
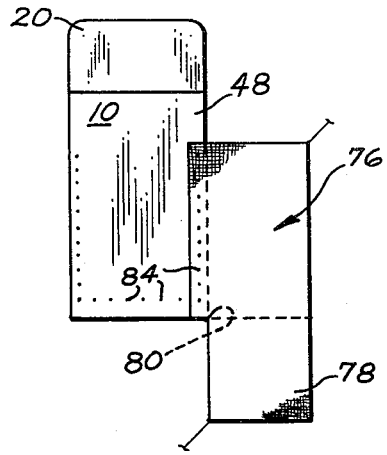
FIG. 4 is another top plan view of a truck camper that is using only the side panel of the modular design of multi-sided awning of the present invention, at the right side of the vehicle.

Turning now to a consideration of the drawings and, in particular, to the overall perspective view of FIG. 1, there is shown a truck camper 10 as is seen in a right-rear perspective view. It should be understood at the outset, that while the present invention of a modular design of a multi-sided awning 12 is shown and described as being attached to a truck camper, this invention is not limited to such use. This invention has general utility as a temporary awning that is easy to erect and dismantle and store away. Its main use is with recreational vehicles (RV) such as: truck campers, motor homes, travel trailers, truck toppers, vans and tent campers.

This truck camper 10 is mounted in the bed of a pickup truck 14. The right door 16 to the truck cab 18 is shown, as well as the hood 20 over the engine compartment and front wheels 22. The rear wheels 26 are also shown.

The camper 10 is a self-contained living quarter having a box-like camper body 28 with side walls 30, side windows 32 and 34, a rear wall 36 with an access door 38 shown in its open position, and another small window 40 in the rear wall. A spare wheel and tire 44 is shown mounted on the rear wall 36 for use in an emergency. A section 49 of the camper body overlies the truck cab 18 for the location of a bed (not shown).

Attention is now directed to the top plan view of FIG. 2 which shows the roof 48 of the truck camper 10. The hood 20 over the engine and the front wheels are at the top of the FIGURE. Thus, the rear wall 36 is at the bottom of the FIGURE.

This FIGURE depicts the prior art. The right side wall 30 is furnished with an automatic roll-out awning 50. The awning fabric material 52, which may be cotton duck, canvas or vinyl, is rolled around a tube 54 which is spring-loaded so there is always some tension on the fabric. The free edge of the fabric is fed through a slot from one end of a slotted awning rail 56 that is mounted on the roof 48 or side wall 30 of the camper body. A rope (not shown) is usually sewn into the hem of the awning fabric to facilitate sliding the fabric into the rail slot. The tube 54 is supported at its two ends by support arms (not shown) that are pivoted at their lower ends to mounting brackets (not shown) on the side of the camper body or the truck body near the floor level. For travel, the awning fabric 52 is rewound on the tube 54, the support arms are pivoted against the camper body and the roll-out awning unit 50 is locked in place.

The rear wall 36 is shown fitted with a pole and stake awning 60 that has fabric material or vinyl 62. One edge of the material 62 is attached to a slotted awning rail 64, that is comparable to the awning rail 56. The opposite edge 66 of the fabric material 62 is provided with means to engage a series of vertical poles which form a raised support means for the awning. Suitable guy ropes 70 are fastened to the top of the poles and are attached to stakes (not shown) that are driven into the ground for maintaining the poles in a vertical position.

While an automatic roll-out awning 50 is shown mounted on the right side wall 30, a smaller version of it could also be mounted on the rear wall 36. Similarly, a larger version of the pole and stake awning 60 could be attached to the side wall 30 of the vehicle.

Up until the time of the present invention, no modular design of multi-sided awnings for use on both the sides and rear of a recreational vehicle has been shown or is available on the market. In the prior art designs of FIG. 2, there is a gap at the right-rear corner of the vehicle between the side awning 50 and the rear awning 60. During a rain storm, a person moving from under one awning to the other awning would be exposed to the rain.

The multi-sided awning 12 of the present invention is illustrated in the top plan view of FIG. 3. It is of modular design, having a rear awning panel 74 and a right side awning panel 76. The side panel 76 has an extension 78 which extends rearwardly from the right-rear corner 80 of the camper body.

The rear awning panel 74 has a first edge 82 for attachment to either the rear edge of the roof 48 or to a top portion of the rear wall 36 of the camper body. The slotted awning rail 64 of the prior art is disliked because of the difficulty of threading the edge of the awning panel through the slot. The fastening means preferred for the edge 82 is what is known as "common sense" fasteners 84 as depicted in FIG. 9, which are spaced, as one example, on 12" centers along the edge of the awning panel. Each fastener 84 comprises a metal ring or grommet 86 attached around a small opening in the awning material. The grommet has an elongated slot 88 for receiving the narrow head 90 of a turn-screw 92 that is screwed into the roof or side wall of the camper body. After the grommet 86 is slipped over the head of the turn-screw 92, the head is turned 90° to lock the grommet under the head.

The opposite edge 96 of the awning panel 74 in FIG. 3 is provided with supporting means to engage vertical telescopic posts 98, as seen in FIG. 1, that support the awning in a raised position. Preferably, the awning panel is sloped downwardly from the camper so the rain water will not accumulate on the awning, but will flow off the edge 96. Suitable guy ropes 100 are attached by stakes 102 to the ground for bracing the posts. The edge 96 might have a metal grommet for receiving the tip of the post or the tips of the posts might be joined by a horizontal bar (not shown) to which the awning edge is tied or otherwise joined.

The right side awning panel 76 has a first edge 106 for attachment to either the side edge of the roof 48 or to the top edge of the side wall 30. Fasteners 84 are also used on this panel edge 106. An opposite edge 108 is supported by vertical telescopic posts 110 and guy ropes 112 as seen in FIG. 1. As mentioned earlier, this side panel 76 has an extension 78 that continues rearwardly beyond the rear wall of the camper body so as to have an edge portion that is coextensive with the third edge 114 of the rear panel 74. A quick-connect fastener means joins the edge 114 to the adjacent edge of the extension 78. Such a fastener means may be a double-acting zipper 116 which can be assembled and disassembled from either end of the zipper.

FIG. 4 shows that the side panel 76 may be used alone along one side of the vehicle.

Figure 5:
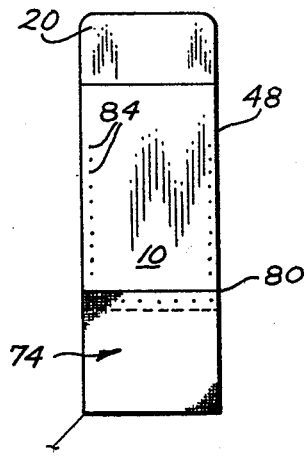
FIG. 5 is another top plan view of a truck camper that is using only the rear panel of the modular design of multi-sided awning of the present invention.

FIG. 5 shows that the rear panel 74 may be used alone at the rear of the vehicle.

Figure 6:
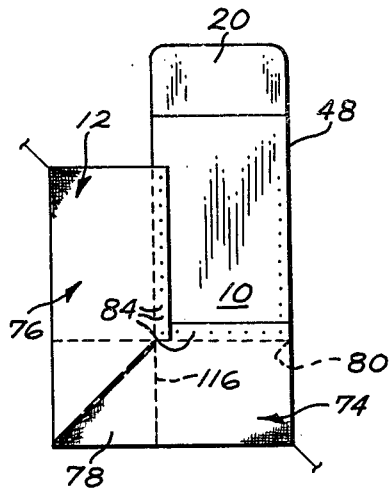
FIG. 6 is a top plan view of a truck camper similar to that of FIG. 3 where the multi-sided awning has been reversed by flipping the entire awning over so the side panel is on the left side of the vehicle rather than on the right side.

FIG. 6 shows that the multi-sided awning 12 is reversible. The panels 74 and 76 are shown zippered together. By merely flipping over the awning 12 of FIG. 3, the side panel 76 may be attached to the turn-screws 92 at the left side of the vehicle, as is shown in FIG. 6. Thus, it is not necessary to provide the rear panel 74 with a zipper along both of its side edges to arrive at the capability of having L-shaped awnings, as depicted in FIGS. 3 and 6.

Figure 7:
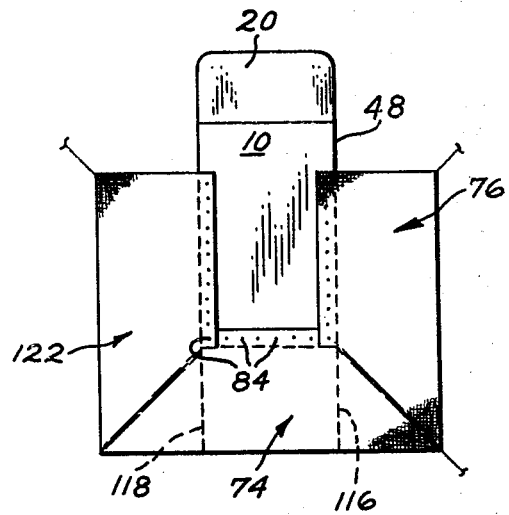
FIG. 7 is a top plan view of a truck camper of another modification where there are three awning panels forming a multi-sided awning that shades three sides of the camper.

Another modification is shown in FIG. 7 where the rear panel 74 has a first zipper 116 and another double-acting zipper 118 along its opposite side edge. A third awning panel 122 is of a shape similar to the side panel 76. This third panel 122 has an extension 124 which includes one-half of the zipper 118 for fastening the rear panel 74 to the side panel 122. This panel 122 also has a first edge that is fastened to the vehicle by fasteners 84.

Figure 8:
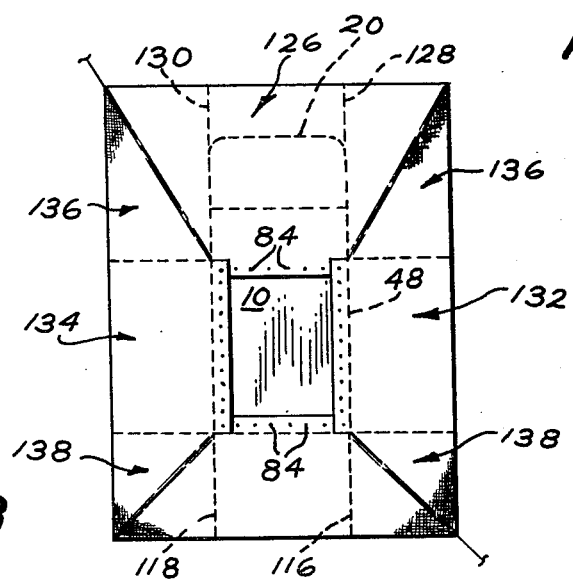
FIG. 8 is another modification showing a top plan view of a truck camper where there are four awning panels forming a large multi-sided awning that extends completely around the camper, on all four sides.

Another modification of the present invention is shown in FIG. 8. This modification has four awning panels which, when they are assembled together, completely encircle the vehicle 10. There is a rear awning panel 74, as is used in the previous modification of FIG. 7, having side zippers 116 and 118. Then there is a front panel 126 that is similar in shape to the rear panel 74. The front panel has two side zippers 128 and 130 that are equivalent to the zippers 116 and 118 of the rear panel. Then there are two similar side panels 132 and 134. Each side panel has a front extension 136 for fastening to the front panel 126 by means of the zipper 128 or 130. Similarly, each side panel has a rear extension 138 for fastening to the rear panel 74 by means of the zippers 116 and 118.

It should be understood that the placement of the zippers is not critical. The front and rear panels 126 and 74 could be provided with side extensions so the zippers 116 and 118 would be generally in the plane of the rear wall 36 of the camper body.

Similarly, the zippers 128 and 130 could be arranged in the plane of the front wall of the overhanging section 49 of the camper body. Of course, suitable poles, stakes and guys would be supplied for the outermost periphery of the four panels for holding the panels in an elevated position. Also, it is contemplated that fasteners 84 would be employed for attaching one edge of each panel to the camper body.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A multi-sided awning for use with a recreational vehicle comprising:
   a. a first awning panel having first fastener means arranged along a first edge of the panel, said fastener means being adapted to engage with a first edge of a wall of the vehicle, and first supporting means arranged on a second opposite edge of the panel, said supporting means being adapted to engage upright support means;
   b. a second awning panel having second fastener means arranged along only a portion of a first edge of the panel, said fastener means being adapted to engage with a second edge of a wall of the vehicle adjacent to said first edge, the remaining portion of said first edge of the second panel being generally coextensive with a third edge of the first awning panel, and second supporting means arranged on a second opposite edge of the second panel, said supporting means being adapted to engage upright support means; and
   c. quick-connect fastener means joining the said coextensive portion of said first edge of the second panel with the third edge of the first awning panel.

2. The invention as recited in claim 1 wherein the said first fastener means of the first awning panel, and the said second fastener means of the second awning panel each comprise a series of spaced clip fasteners.

3. The invention as recited in claim 1 wherein the said quick-connect fastener means joining the two awning panels comprise a slide fastener.

4. The invention as recited in claim 3 wherein the said slide fastener is a double-acting zipper.

5. The invention as recited in claim 1 wherein the said upright support means for both the second edge of the first awning panel and the second edge of the second awning panel comprise poles, stakes and guys.

6. The invention of claim 5 wherein the said quick-connect fastener means joining the two awning panels comprises a slide fastener.

7. The invention of claim 6 wherein the said slide fastener is a double-acting zipper.

8. The invention of claim 7 wherein the said first and second fastener means comprise spaced grommets on the awning panels and similarly spaced turn-screws mounted on the vehicle which lock with the grommets.

9. The invention of claim 1 with the addition of a third awning panel having third fastener means arranged along only a portion of a first edge of the panel, said fastener means being adapted to engage with an edge of a wall line of the vehicle, the remaining portion of said first edge of the third panel being generally coextensive with a fourth edge of the first awning panel, and third supporting means arranged on a third opposite edge of the third panel, said supporting means being adapted to engage upright support means, and quick-connect fastener means joining the said coextensive portion of said first edge of the third panel with the fourth edge of the first awning panel.

10. The invention of claim 9 wherein the said quick-connect fastener means joining the first and third awning panels is a slide fastener.

11. The invention of claim 10 wherein the said slide fastener is a double-acting zipper.

12. The invention of claim 11 wherein the said upright support means for the second edge of all three awning panels comprise poles, stakes and guys.

13. The invention as recited in claim 9 wherein the said first, second and third fastener means comprise a series of spaced turn-screw and grommet fasteners.

14. The invention as recited in claim 1 wherein the said first and second fastener means comprise a series of spaced turn-screw and grommet fasteners.

15. A complete awning for encircling a recreational vehicle comprising:
   a. a first awning panel having first fastener means arranged along a first edge of the panel, said fastener means being adapted to engage with an edge of a wall line of the vehicle, and first supporting means arranged on a second opposite edge of the panel, said supporting means being adapted to engage upright support means;
   b. a similar second awning panel for mounting on the opposite side of the vehicle, said second panel having first fastener means arranged along a first edge of the panel, said fastener means being adapted to engage with an edge of a wall line of the vehicle, and second supporting means arranged on a second opposite edge of the panel, said second supporting means being adapted to engage upright support means;
   c. a third and a fourth awning panel of similar configuration for use on the two remaining sides of the vehicle, each such panel having fastener means arranged along a mid-section of a first edge of each panel, and both a front and a rear extension on each such panel, each extension having an edge that is generally coextensive with a third edge of one of the first and second panels, each such third and fourth panels having supporting means arranged on its peripheral edge that is adapted to engage upright support means; and
   d. quick-connect fastener means joining the said coextensive portions of the first panel with the third and fourth panels, and also between the second panel and the third and fourth panels.

16. The invention as recited in claim 15 wherein the said fastener means comprises a series of spaced clip fasteners.

17. The invention as recited in claim 16 wherein the said quick-connect fasteners comprise slide fasteners.

18. The invention as recited in claim 15 wherein the said fastener means comprises a series of spaced turn-screw and grommet fasteners.

* * * * *